United States Patent [19]

Hunter et al.

[11] Patent Number: 5,988,048
[45] Date of Patent: Nov. 23, 1999

[54] APPARATUS FOR SHAPING DEEP-FRIED FOOD PRODUCT

[75] Inventors: Thomas B. Hunter, Collinsville, Ill.; Neil J. Trager, Bridgeton, Mo.

[73] Assignee: Kerry Inc., Beloit, Wis.

[21] Appl. No.: 09/024,108

[22] Filed: Feb. 17, 1998

[51] Int. Cl.[6] .............................. A47J 37/00; A47J 37/12; A23P 1/00
[52] U.S. Cl. .................. 99/413; 99/415; 99/418; 99/442; 99/450
[58] Field of Search .................................. 99/394, 421 A, 99/407–418, 353, 450; 211/181.1

[56] References Cited

U.S. PATENT DOCUMENTS

| | | | |
|---|---|---|---|
| 489,056 | 1/1893 | Westheimer | 99/394 |
| 1,487,909 | 3/1924 | Andrews | 99/407 |
| 3,279,353 | 10/1966 | Shelor | 99/407 |
| 4,173,926 | 11/1979 | Brignall | 99/349 |
| 4,535,688 | 8/1985 | Bentson | 99/353 |
| 4,542,685 | 9/1985 | Wilson | 99/413 |
| 5,537,917 | 7/1996 | Schiffer et al. | 99/442 |
| 5,662,027 | 9/1997 | Neville et al. | 99/415 |
| 5,676,050 | 10/1997 | Beck | 99/428 |

*Primary Examiner*—Timothy Simone
*Attorney, Agent, or Firm*—Griffin, Butler, Whisenhunt & Szipl, LLP

[57] ABSTRACT

The invention includes a process for preparing a unified serving of a batter-cooked food, for example shrimp tempura in the shape of a ring, that comprises the steps of: providing multiple pieces of a food to be cooked; coating each piece with a batter; frying the coated pieces in a mold in a hot oil or fat medium in order to cook the food, expand the batter, and join the battered pieces into a shaped food product reflecting the shape of the mold; and removing the shaped food product from the oil or fat and the mold. The cooking mold is preferably a deep-frying cooking vessel assembly comprising a generally U-shaped channel of flat metal. The cooking vessel assembly is configured with apertures and with a handle and/or a scraper. The apertures and handle are configured to provide quick submerging and quick fryer medium contact around the food being deep-fried in the cooking vessel assembly. The cooking vessel assembly is further configured to shape food items to be deep-fried in the cooking vessel assembly.

10 Claims, 4 Drawing Sheets

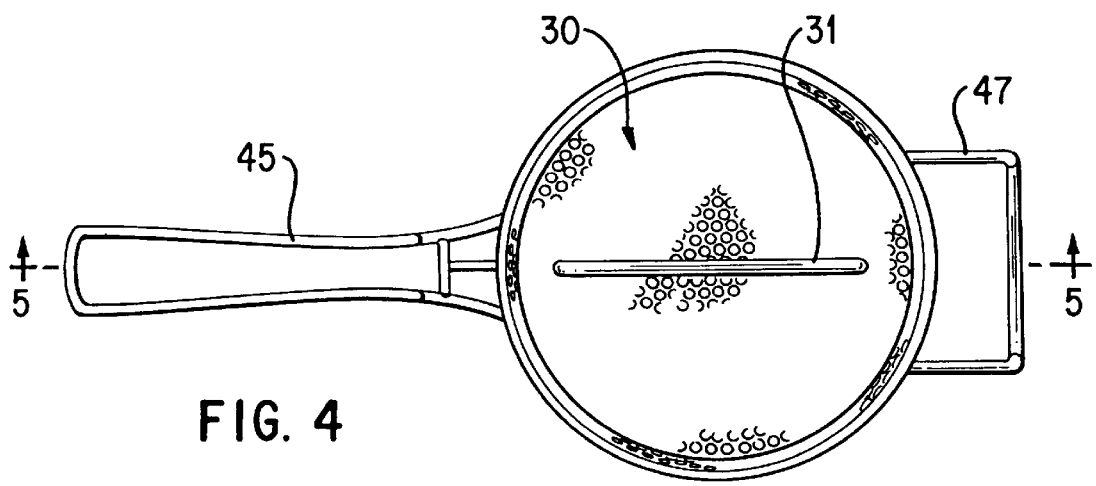
FIG. 4
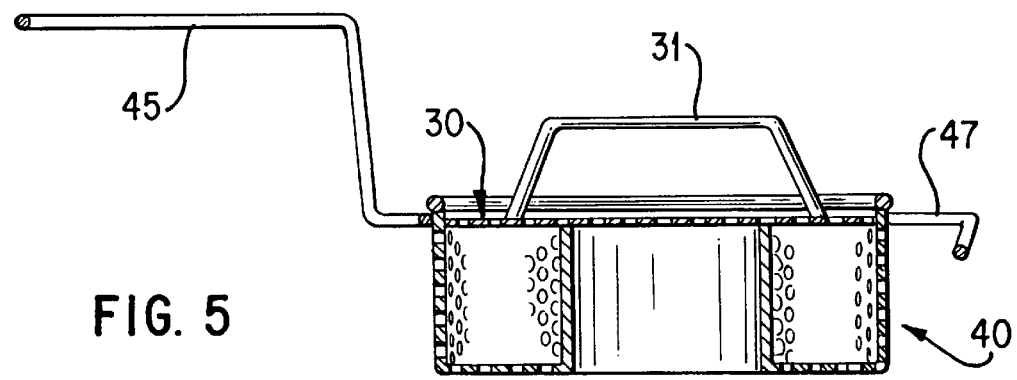
FIG. 5
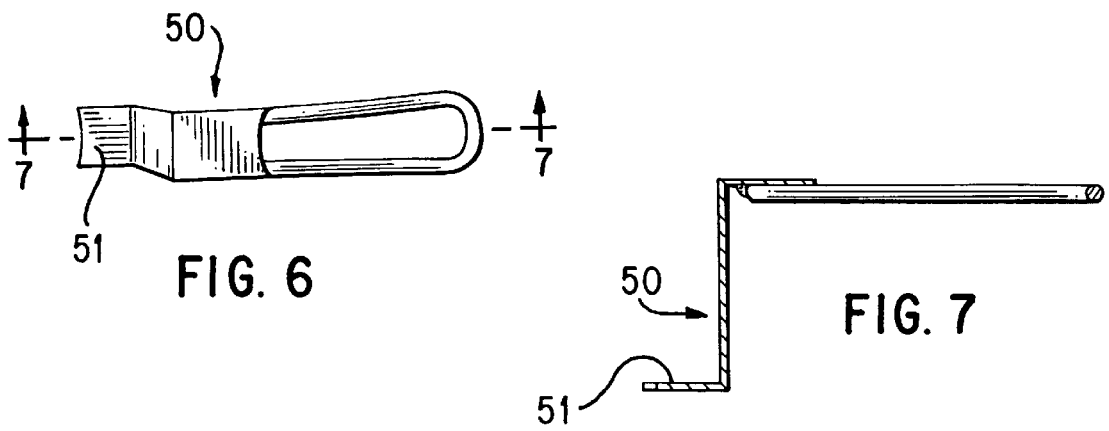
FIG. 6
FIG. 7

APPARATUS FOR SHAPING DEEP-FRIED FOOD PRODUCT

FIELD OF THE INVENTION

This invention is concerned with the cooking of foodstuffs. More particularly, this invention relates to improvements in devices and processes pertaining to the art of deep-frying.

DESCRIPTION OF THE PRIOR ART

Deep-frying, or cooking by immersion in very hot oil or melted fat, has long been known as a way to cook food quickly. Deep-frying processes generally allow the interior of the food products being cooked to retain their natural moisture or juiciness. At the same time, the deep-frying process can impart a crispiness and attractive flavor to the outer surfaces of the food products. The crispiness and flavor attributes are often enhanced by the use of flour-based batters and/or breaders.

One aspect of deep-frying that has received much attention has been the equipment used to contain and manipulate the food products as they are being cooked in the hot oil. Often the food products are placed into a basket-like apparatus for immersion in the cooking medium. U.S. Pat. No. 3,279,353, for instance, shows a food-holding basket of perforated wall, annular construction. The basket constitutes a generally U-shaped channel designed to be filled substantially to its top with food or products such as chicken parts. The device described by the patent is not designed to shape the food products as they are being cooked.

Some patents have issued which do relate to the shaping of food products while deep-frying them. U.S. Pat. Nos. 4,173,926 and 4,535,688 both relate to the hot-oil immersion cooking of tortillas. The '926 patent teaches forming an individual tortilla into a pie shell shape. The '688 patent teaches forming an individual tortilla into a dish shape. In both cases, the shaping of a single tortilla is accomplished with a mold that contacts bottom as well as top surfaces of the tortilla in order to achieve the desired shape.

U.S. Pat. No. 4,542,685 describes an apparatus into which funnel cake batter is poured during a deep-frying operation. The batter is disclosed to hit a solid bottom portion of a flat pan and then to rise in the frying oil. The apparatus described in this patent may have drainage apertures in its bottom. However, the patent teaches that the vast majority of the bottom portion must be solid to enable the poured batter to hit the bottom portion to form a unitary mass.

The prior art does not provide a means for the concurrent cooking and shaping of a unitary food product made from food items of substantial thickness, such as seafood items, bite-sized meat pieces, vegetable chunks, and the like.

It is an object of this invention to provide methods and apparatuses for cooking a plurality of individual pieces of food of substantial thickness.

It is another object of this invention to provide methods and apparatuses for preparing a cohesive unitary serving of food made up of a plurality of individual pieces of food of substantial thickness.

It is yet another object of this invention to provide methods and apparatuses for concurrently cooking a plurality of individual pieces of food and shaping them into a cohesive unitary serving of food.

These and other objects and advantages of the present invention will be made apparent from the following description when taken in conjunction with the accompanying drawings.

SUMMARY OF THE INVENTION

The present invention presents a process for preparing a unified serving of a batter-cooked food that comprises providing multiple pieces of a food to be cooked, coating each piece with an expandable batter, immersing the coated pieces in a mold in a deep-frying medium in order to cook the food, expand the batter, and join the battered pieces into a shaped food product reflecting the shape of the mold, and removing the shaped food product from the deep-frying medium and the mold.

While the food items may be prepared and cooked just prior to deep-frying in accordance with the present invention, it is often advantageous to carry out some steps well in advance of the deep-frying operation. Thus, the multiple pieces of food may be battered and/or breaded and then frozen, either raw or partially fried. At a later time, the frozen or defrosted pieces may be placed in a mold in accordance with this invention and sprayed with a thin batter or water mist to facilitate their binding together. They can then be deep-fried, creating the unitary shaped food product in accordance with the present invention. This "freezer to fryer" approach will be especially useful in the context of the food service industry.

The mold is advantageously a deep-frying cooking vessel assembly comprising a generally U-shaped channel of flat metal, configured with apertures and with a handle and scraper. The apertures (by permitting flow) and handle (by facilitating shaking food items off of the inner walls of the vessel) and scraper (by dislodging food items that may be stuck to the inner walls of the vessel) are configured to provide quick heat sink by allowing for submerging and quick fryer medium contact around the food in the cooking vessel assembly. The cooking vessel assembly is further configured with shape-defining means to shape food items to be deep-fried therein.

The cooking vessel assembly of the invention is preferably made of stainless steel plate having holes bored therein. In the cooking vessel assembly of the invention, the apertures preferably constitute from 30 to 90 percent of the area of the bottom of the generally U-shaped channel, and the generally U-shaped channel is preferably both annular and flat-bottomed. The shape-defining means of the cooking vessel assembly of the invention preferably comprises vertical walls of the generally U-shaped channel, and may additionally comprise a lid on the generally U-shaped channel.

An example of a unified food serving produced by the process of the invention is shrimp tempura arranged in the shape of a ring.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features, and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 4 is a top perspective view of a basket cooking vessel assembly with handle, hook, and lid in accordance with the present invention;

FIG. 5 is a sectional side view of a cooking vessel assembly in accordance with the present invention, along line 5—5 of FIG. 4, showing a basket having a handle, a hook, and a lid in place;

FIG. 6 is a top perspective view of a scraper in accordance with the present invention;

FIG. 7 is a sectional view of a scraper in accordance with the present invention, along line 7—7 of FIG. 6;

DESCRIPTION OF THE PREFERRED EMBODIMENTS

Figure 1:
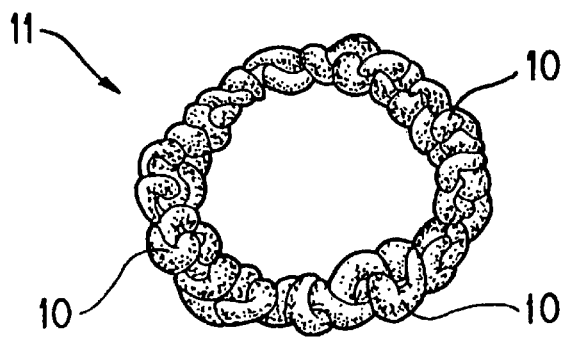
FIG. 1 is a schematic top view of cooked battered shrimp, joined together into a ring in accordance with one embodiment of the present invention.

The following terminology is used in connection with describing and claiming the present invention:

"Deep-frying" is the process of immersing a food product in a deep-frying medium in order to cook it. A "deep-frying medium" is oil, fat, or other such liquids heated to a temperature suitable for cooking food immersed therein.

A "cooking vessel" is a structure capable of sequestering a food article during a cooking operation. In the present context, for example, an apertured metal vessel can be used to segregate battered shrimp from the oil in which it is to be cooked, while still permitting the oil to have access to the shrimp in order to cook it. The terminology "cooking vessel assembly" connotes the cooking vessel with auxiliary items such as handles, a lid or top, hooks, legs or stands, and other such features as are incidental to or facilitate the use of the cooking vessel. The term "aperture" signifies a void through which oil can move into and out of the cooking vessel. In the preferred embodiments of the invention, the apertures are holes in the metal plate that makes up the cooking vessel.

"Quick heat sink" denotes allowing for quick submerging of the cooking vessel and quick fryer medium contact around the food in the cooking vessel assembly.

"Shape-defining means" herein includes the parts of the cooking vessel that impart shape to the food product to be cooked. The shape-defining means thus includes the vertical walls of the cooking vessel and may include a lid. Another aspect of the shape-defining means is the food pieces to be shaped. For example, where a food product to be cooked by deep-frying is battered shrimp, where the cooking vessel is a generally U-shaped channel that is formed into a ring, the shrimp will be formed into a ring by the walls of the vessel.

The terminology "generally U-shaped channel" as used herein refers to an element having a cross-section that generally resembles the letter "U". That is, the cross-section has a width that defines the bottom of the "U" and a depth that defines the sides of the "U". This element constitutes a channel because its length is formed substantially greater than its width. The width and the length of the channel must be great enough to provide shape-defining means for a food product being cooked in a vessel having the generally U-shaped channel. For example, to cook food pieces 0.5 inches thick by 2 inches in length, the width of a ring-shaped channel would preferably range from 3 to 5 inches. Widths substantially less than 3 inches would not allow enough food pieces to join together to form a cohesive ring. Widths substantially greater than 5 inches would result in a ring too big to support itself. Length of the channel contributes more to the aesthetics of the unitary food product than to the structural integrity of the unitary food product. Too short a length would result in an unattractive appearance; too long a length would also be unattractive and might suffer from lack of structural integrity. In the case of a channel having a width of 3 inches, lengths of 9 to 21 inches would be most attractive; for a width of 5 inches, lengths of 10 to 30 inches would be most attractive. Where the channel is in the shape of a ring, these widths would be measured midway between inner and outer rims of the channel. The depth of the channel must be great enough to allow for enough food pieces to join together to form a cohesive ring. For example, with food pieces of 0.5 by 2 inches, depths of from 5 to 9 inches would be optimum. The generally U-shaped channel provides the space in which cooking takes place.

One object of the deep-frying process of the present invention is the preparation of a unified serving of a food that normally exists in pieces. For example, individual shrimp to be served as shrimp tempura may in accordance with the present invention be connected with one another in a presentable ring, as shown schematically in FIG. 1. In FIG. 1, individual shrimp 10 are joined together to form a ring 11.

The Apparatus

Figure 2:
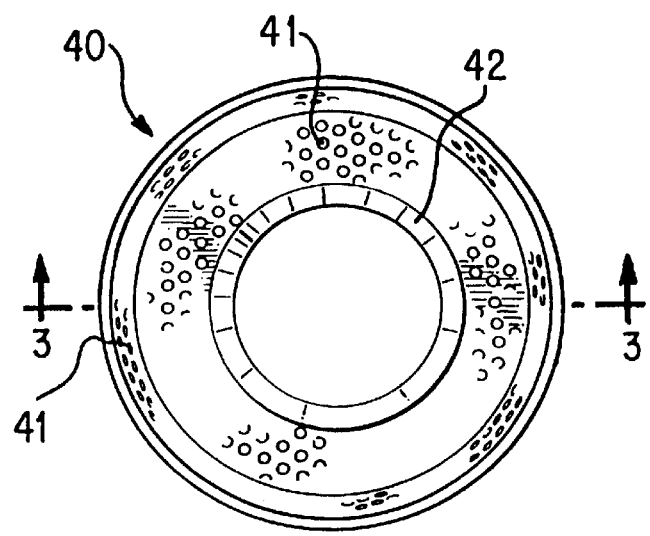
FIG. 2 is a top perspective view of a basket in accordance with the present invention.
Figure 3:
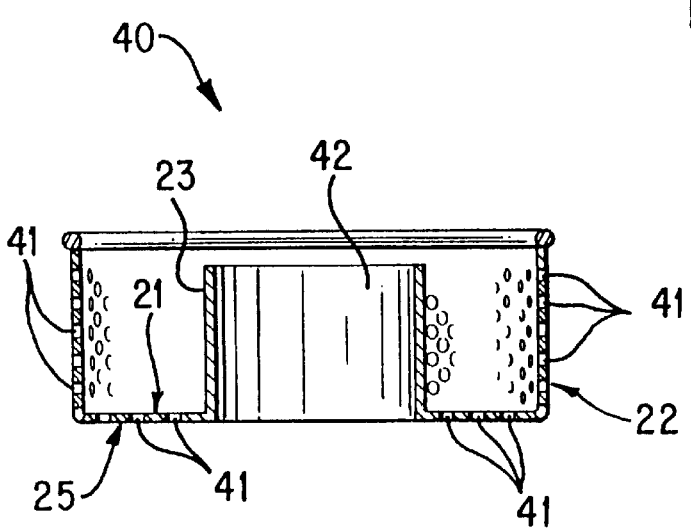
FIG. 3 is a sectional side view of a basket in accordance with the present invention, along line 3—3 of FIG. 2.

FIG. 2 shows an example of a preferred basket-like cooking vessel in accordance with the present invention. The basket of FIG. 2 is made of flat metal. FIG. 3 shows a sectional side view, along line 3—3 of FIG. 2 of the same cooking vessel. As shown in FIG. 3, the cooking vessel takes the form of a basket 40 having a flat bottomed interior 21, a flat bottomed exterior 25, a substantially vertical outer wall 22, and an inner ring 42 with substantially vertical walls 23. FIG. 2 shows a perspective view of the same basket 40. In FIG. 2, apertures 41 are visible. Note that inner ring 42 is not apertured.

Figure 12:
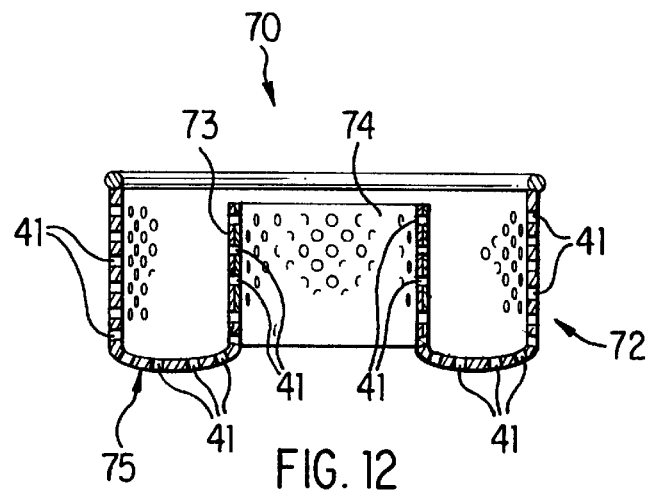
FIG. 12 is a sectional side view of a rounded bottom basket in accordance with the present invention.

FIG. 12 shows a sectional side view of cooking vessel in accordance with the present invention that takes the form of a basket 70 having a rounded bottom 75, an outer wall 72 that curves inwardly at its bottom, and an inner ring 74 with an inner wall 73 that curves outwardly at its bottom. In FIG. 12, apertures 41 are visible. Note that wall 73 of inner ring 74 is apertured.

The vertical members of the generally U-shaped channel may have the same or different configuration. They need not extend at a right angle from the horizontal member. When both vertical members of the U-shaped channel extend at right angles from the horizontal member, as in FIGS. 3 and 12, the inner and outer cooking vessel walls will be conical. The vertical members of the U-shaped channel must, however, have sufficient vertical component to provide a wall to contain food items to be cooked therein. One contemplated variation (not shown) has the inner wall angled inwardly, in which case the central part of the cooking vessel has a frusto-conical configuration. The horizontal member of the U-shaped channel may be rounded downward, as in FIG. 12. Often, however, it will form a flat bottom, as in FIG. 3.

Figure 13:
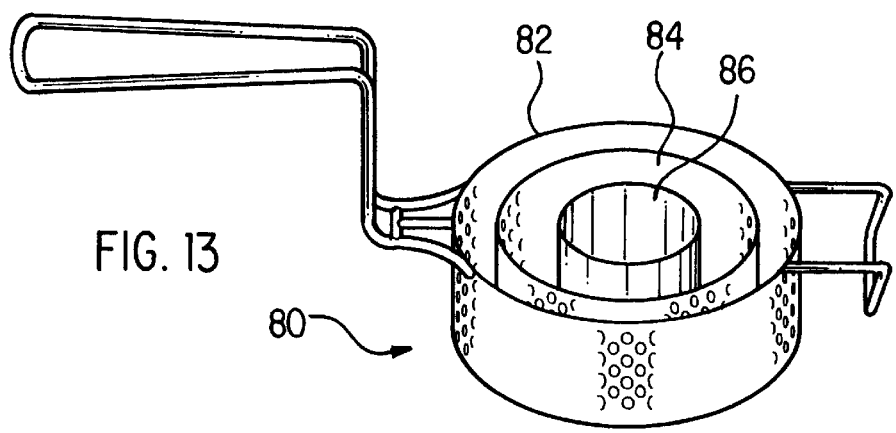
FIG. 13 is a perspective view of a duplex basket with handle and hook, in accordance with the present invention.

FIG. 13 shows a perspective view of a duplex cooking vessel in accordance with the present invention. This embodiment takes the form of a basket 80 having an apertured outer wall 82, an apertured intermediate wall 84, and an inner ring 86. As explained in greater detail below, this configuration provides for extra flexibility in the preparation of unified servings of food items.

A cooking vessel assembly of the present invention must be made of a material that can withstand the high temperatures incidental to deep-frying processes. The material must also be suitable for contact with food, and must be capable of being thoroughly cleaned between uses. Suitable materials for the construction of cooking vessel assemblies of the present invention include stainless steels, particularly grades thereof such as number 304 stainless steel. Especially preferred for making the cooking vessels is pre-punched number 304 stainless steel plate. It is contemplated that a cooking vessel assembly of the present invention could be made in whole or in part of materials other than stainless steel, such as aluminum coated with a high temperature Teflon.

Bottom apertures 41 constitute an important part of the present invention. In operation of the basket, taking shrimp tempura as an example, the shrimp must have quick direct contact with the oil in order to allow the tempura batter to expand properly and unite the shrimp into a presentable ring. To achieve this, the bottom of the basket must have sufficient openings therein so that when the basket is immersed in the oil, oil quickly passes through those openings while the tempura batter is being initially set and the shrimp are being formed into the ring. Openings on the side and top of the basket promote a free flow of oil around the shrimp as they are being cooked.

In accordance with the present invention, the cooking vessel or basket is configured to provide a quick heat sink to the food items being deep-fried. Quick heat sink is achieved by rapidly immersing a basket which has enough aperture space through its bottom and side walls to permit rapid fryer medium contact around the food being fried.

The bottom of the cooking vessel should have sufficient apertures to enable the objective described in the preceding paragraph. Too few and/or too small apertures would result in a cooking vessel that could not allow for quick enough direct oil contact. Too many and/or too large apertures would comprise the container function of the cooking vessel. In a preferred embodiment of the present invention, apertures constitute from 30 to 90 percent of the area of the bottom of the cooking vessel. The apertures will preferably range in size from 0.25 to 0.75 inches. While the apertures will ordinarily be circular, they may be configured as slots or other shapes.

When employing a cooking vessel assembly of the present invention in "freezer to fryer" mode—that is, to cook frozen or partially defrosted food pieces that have been arranged in the basket and sprayed with a thin batter solution or water mist to facilitate binding—it is necessary to achieve "quick heat sink" in order to fuse the pieces into an attractive and fully cooked cohesive unitary serving such as a ring.

FIG. 4 shows a perspective view of a basket with handle 45, hook 47, and lid 30, in accordance with the present invention. Lid 30 has its own handle 31. Cooking vessel handle 45 is used to place the basket into cooking oil and to remove it from the oil, in a conventional manner. Handle 45 can also be used to shake the contents of the basket at the commencement of the cooking operation, as described herein below. Hook 47 is used to facilitate suspension of the basket on the fryer when not in oil, in a conventional manner. The lid may be used in accordance with the present invention to obtain a greater degree of control over the shaping of the unified food product, as described herein below. FIG. 5 shows a sectional side view of the cooking vessel assembly of FIG. 4, along line 5—5 of FIG. 4.

Figure 10:
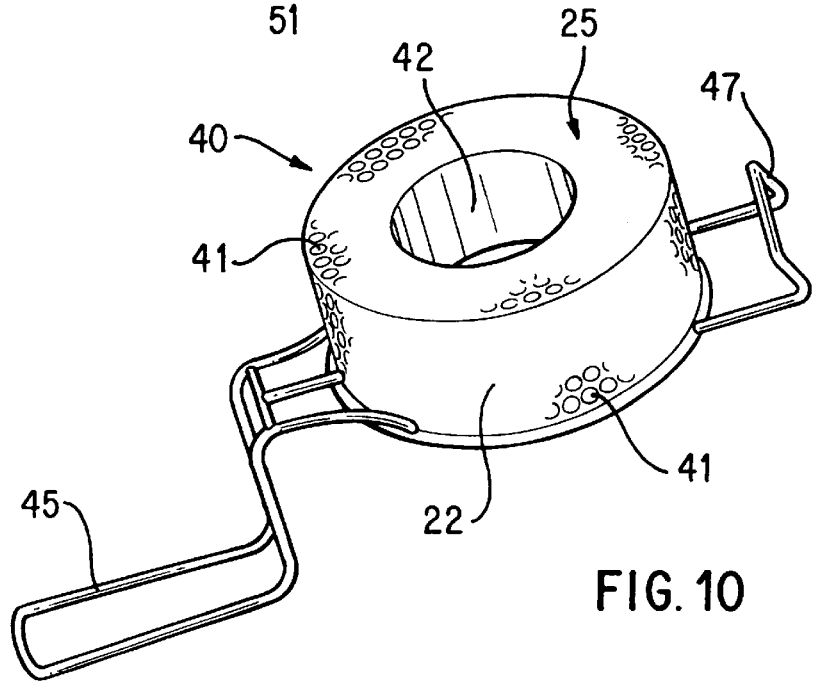
FIG. 10 is a bottom perspective view of a basket with handle and hook, in accordance with the present invention.

FIG. 10 shows a bottom perspective view of a basket with handle and hook, in accordance with the present invention. As illustrated in FIGS. 2 and 10, the central ring 42 need not be apertured. While that portion of the cooking vessel may be apertured, it has been found that perforations in the central ring do not greatly enhance uniform cooking of such food products as shrimp. Non-apertured central rings are preferred in accordance with the present invention because they provide a smooth surface and decrease the possibility of the unified food product, for instance a shrimp ring, catching against that surface when being decanted onto the presentation plate.

FIG. 6 shows a perspective top view of a scraper unit 50 having a scraper blade 51, in a configuration suitable for use with a flat-bottomed basket of the invention. FIG. 7 shows a sectional view along line 7—7 of the scraper of FIG. 6.

Figure 8:
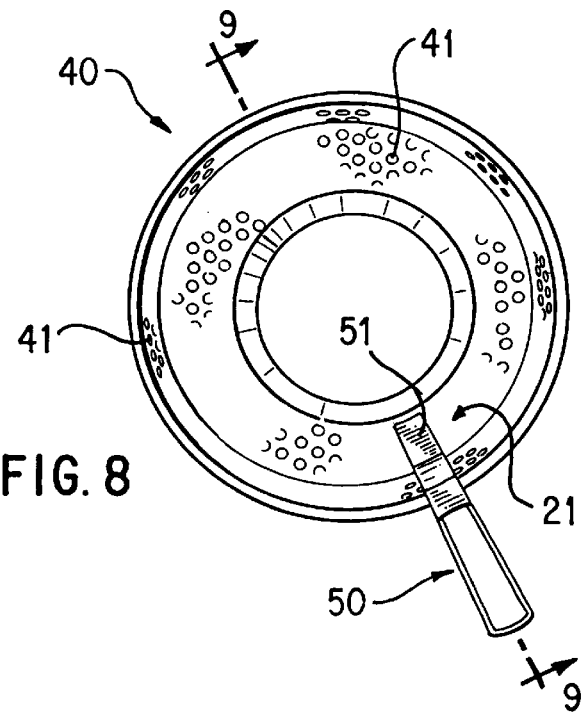
FIG. 8 is a top perspective view of a cooking vessel assembly in accordance with the present invention, showing a scraper in place in a basket.
Figure 9:
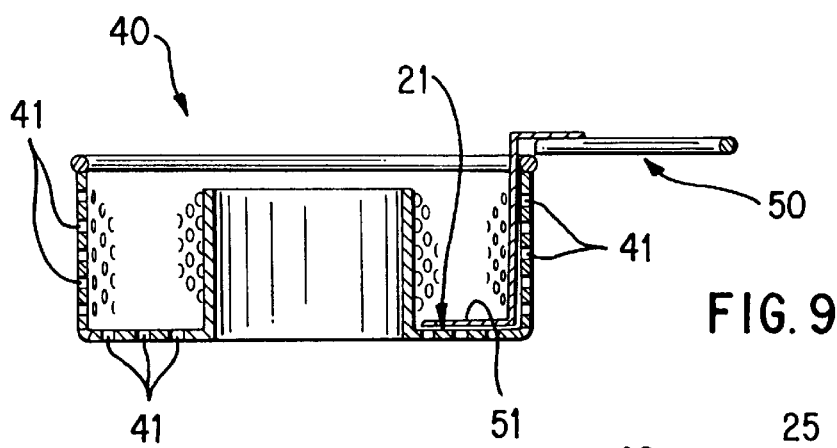
FIG. 9 is a sectional side view of a cooking vessel assembly in accordance with the present invention, along line 9—9 of FIG. 8, showing a scraper in place in a basket.

As shown in FIG. 8, a cooking vessel assembly in accordance with the present invention may be assembled by placing a scraper 50 into a basket 40. FIG. 9 shows a sectional perspective along line 9—9 of the basket and scraper assembly of FIG. 8. Scraper 50 is configured to contact one side and the bottom of basket 40. An alternative scraper configuration (not shown) contacts both sides as well as the bottom of a flat-bottomed basket of the invention. In still another alternative of the invention (not shown), a basket with a concave bottom is fitted with a scraper configured to contact its sides and bottom.

Cooking Procedure

In a preferred embodiment of the present invention, from about 60 to about 90 shrimp, preferably peeled and de-veined and having their tails removed, are pre-dusted with flour. One may use as a pre-dust, for example, bleached wheat flour containing salt, spices if desired, dried onion, and/or dried garlic. As few as about 30 shrimp can be used to produce an excellent ring.

The pre-dusted shrimp are placed into a basket assembly made in accordance with the principles of the present invention, optimally including a scraper. The shrimp should be placed evenly around the ring and should overlap, touching one another. When a duplex basket embodiment of the present invention is used, one may place the shrimp into both rings, to produce a unified serving of food comprising two concentric rings. The two concentric rings can be served together, or they can easily be separated to provide separate portions. Alternatively, one may use the inner ring alone to prepare a smaller portion or the outer ring alone to prepare a larger portion.

Any flour-based batter formulation can be used so long as it expands on cooking and helps to hold the cooked food pieces together in the unified serving of the invention. Typical batter formulations contain from 45–65% yellow corn flour and from 30–50% bleached wheat flour. They can also contain, for example, up to 2% each of dextrose, salt, leavening, whey, and/or nonfat milk. It has been found advantageous to use batter formulations that are slightly thinner than those which would generally be used for deep-frying individual pieces of food (that is, not unified servings in accordance with the present invention).

Five pounds of a batter mix as described are dispersed in one gallon of cold tap water, within a large container. The basket containing the pre-dusted shrimp is submerged, in the container containing the batter dispersion, to a level just above the top of the shrimp. The basket containing the now-battered shrimp is removed from the batter container and excess batter dispersion is allowed to drain off. A lid may then placed on the basket to complete configuration of a cooking vessel assembly.

The basket with the battered shrimp therein is quickly immersed in oil that has been heated to an elevated temperature, for instance 350–360° F. The basket is shaken up and down once as it is submerged. Referring to FIG. 2, the oil quickly penetrates through the apertures, thus uniting the shrimp into the presentable ring. To achieve this, the bottom of the basket must have openings so that when the basket is quickly placed into the oil, oil quickly passes through those holes as well as other holes such as side holes. When placing the basket into the oil, it is advantageous to slightly shake the basket, as indicated above, or to rotate the basket or otherwise place some motion on the basket in order to dislodge any shrimp that may have stuck to the bottom of the basket. Additionally or alternatively, to ensure that no shrimp have stuck to the basket while frying, a scraper is used to dislodge shrimp from the bottom of the basket after frying, if required.

As illustrated in FIGS. 4, 5, and 10, the basket may be provided with a handle and with conventional legs or rests, and other appendages appropriate for suspending the basket when not in the hot oil and for manipulating the basket and lid.

At times, the shrimp may stick to the bottom of the basket. When this happens, the basket is shaken or rotated by means of a handle to loosen the food. After frying, a scraper may be rotated around the basket so as to break any shrimp that are stuck loose from the bottom of the basket. During frying, the tempura batter expands and unites each individual shrimp into the presentable rings.

After the shrimp have fried for 2½ to 3 minutes, depending on the size of the shrimp and the thickness of the batter, the basket is removed from the hot oil, generally using a handle. An insulated glove should be used for manipulating the handle and the lid at this point. Excess oil is allowed to drain from the assembly, the lid is removed, and the basket is inverted over a flat surface (sheet pan, cutting board, or the like). The open side of the basket is hit against the flat surface, allowing the shrimp ring to drop thereupon. If necessary, a fork or the scraper may be used to dislodge any area that sticks. A serving plate is then placed over the shrimp ring, the plate and flat surface are inverted, the flat surface is removed, and a sauce dish is placed into the center of the ring, providing a ready-to-serve unitary shrimp tempura ring.

The ring of shrimp may be garnished as desired, possibly with a glaze. Individual shrimp are easily broken from the presented ring of shrimp. This dish may be used as an appetizer, served among a number of people, or may be served to an individual as a main course.

In accordance with the present invention, then, the shrimp are uniformly cooked and presented in an attractive manner so as to increase the appeal of the food. The method is quite applicable to so-called fast food service as well as institutional service and easily provides controlled serving portions.

For "freezer to fryer" applications, products with conventional coating systems used by food processors to produce fried vegetables, shrimp, chicken wings, onion rings, and so on can be used in the ring basket. In use, they will generally be batter-sprayed or water-misted to facilitate binding. The mold will often then be covered with lid 30 as illustrated in FIGS. 4 and 5.

Variations

Figure 11:
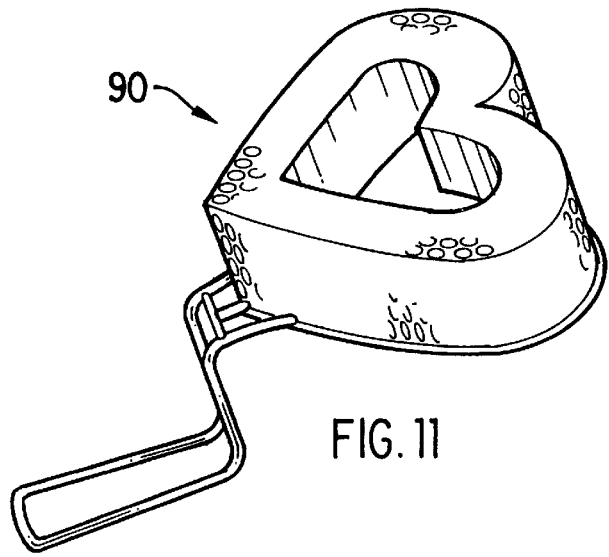
FIG. 11 is a bottom perspective view of a heart-shaped basket in accordance with the present invention.

While the invention has been described by reference to a ring configuration, the generally U-shaped channel may be arranged in other shapes such as in the shape of a square, a triangle, a pentagon, or even in a non-geometric shape such as horseshoe or a heart. FIG. 11 depicts a basket 90 of this invention in the shape of a heart. One must make provision, however, to adequately shake the basket to prevent sticking of the food to the bottom of the cooking vessel or to provide an appropriately shaped scraper to ensure that the food does not stick to the bottom of the basket.

Many different types of food may be prepared in accordance with the present invention. For instance, small or cut up vegetables, meat chunks, chicken wings, seafood pieces, dough balls, and the like could be deep-fried in accordance with the present invention. Certain recipes might call for mixing two or more different kinds of food, such as for instance whole small onions and beef chunks or other vegetables and seafood. The duplex basket embodiment of the present invention allows for even greater variation in the food items that make up the unified servings obtainable with the present invention. An important feature of the present invention is that it provides an apparatus and method for cooking food items having thicknesses of from 0.25 by 0.25 inches to 2.5 by 2.5 inches or even greater.

The batter itself may provide a source of variation in the unified food products that may be prepared in accordance with the principles of this invention. That is, the batter may be colored and/or textured to enhance the appearance of the unified food product. Thus, for example, another embodiment of the present invention would involve the use of a heart-shaped cooking vessel and red colored batter, to form a food product particularly appropriate for Valentine's Day.

While there have been described and illustrated various specific embodiments of the invention, I will be clear that variations in the details of the embodiments specifically illustrated and described may be made without departing from the true spirit and scope of the invention as defined in the appended claims.

What is claimed is:

1. A deep-frying cooking vessel assembly comprising an annular generally U-shaped channel of flat metal, said cooking vessel assembly being configured with apertures and with a handle or a scraper, and said cooking vessel assembly being further configured with shape-defining means to shape food items to be deep-fried in said cooking vessel assembly.

2. The cooking vessel assembly of claim 1, wherein said cooking vessel assembly is configured with apertures and with a handle, said apertures and handle being configured to provide quick submerging and quick fryer medium contact around food items to be deep-fried in said cooking vessel assembly.

3. The cooking vessel assembly of claim 1, wherein said apertures constitute from 30 to 90 percent of the area of the bottom of said generally U-shaped channel.

4. The cooking vessel assembly of claim 3, wherein said generally U-shaped channel is flat-bottomed.

5. The cooking vessel assembly of claim 4, comprising an annular flat-bottomed generally U-shaped channel made of stainless steel plate wherein said apertures are holes bored in said stainless steel plate.

6. The cooking vessel assembly of claim 1, wherein said shape-defining means comprises vertical walls of said generally U-shaped channel.

7. The cooking vessel assembly of claim 6, wherein said shape-defining means additionally comprises a horizontal element constituted by a displaceable member adapted to define a lid on said generally U-shaped channel.

8. A deep-frying cooking vessel assembly comprising an annular generally U-shaped channel of flat stainless steel plate having holes bored therein, said cooking vessel assembly being further configured with shape-defining means to shape food items to be deep-fried in said cooking vessel assembly.

9. A deep-frying cooking vessel assembly comprising a generally U-shaped channel of flat metal, said cooking vessel assembly being configured with apertures and with a handle or a scraper, wherein said generally U-shaped channel provides a unitary uninterrupted shape-defining means around a perimeter of said cooking vessel assembly to shape food items to be deep-fried in said cooking vessel assembly.

10. A deep-frying cooking vessel assembly comprising a generally U-shaped channel of flat stainless steel plate having holes bored therein, wherein said generally U-shaped channel provides a unitary uninterrupted shape-defining means around a perimeter of said cooking vessel assembly to shape food items to be deep-fried In said cooking vessel assembly.

* * * * *